Patented June 12, 1934

1,962,774

UNITED STATES PATENT OFFICE 1,962,774

COLORED CELLULOSIC COMPOSITION

Alphons O. Jaeger, Mount Lebanon, Pa., assignor to The Selden Company, Pittsburgh, Pa., a corporation of Delaware No Drawing. Application January 21, 1931, Serial No. 510,281

1 Claim. (Cl. 106—22)

This invention relates to compositions containing colored cellulose esters of organic acids and more particularly is directed to compositions containing colored cellulose acetate.

In the past cellulose acetate has been used to some extent for molding plastics and particularly for coating compositions or films. It presents many advantages over the cheaper nitrocellulose from the standpoint of non-inflammability, safety from the formation of poisonous fumes on burning, etc. Nevertheless cellulose acetate and other organic esters of cellulose such as cellulose formate and the like have not achieved the commercial success in the field of colored plastics and coating compositions to which their properties would entitle them. This has largely been due to the difficulty of preparing colored cellulose acetate or similar organic esters which are fast to light and which compositions form tough, easily workable products. But few dyes are capable of dyeing cellulose acetate compositions, and in many cases these dyes are relatively fugitive. The most resistant colors, for example the best vat dyes, almost without exception will not dye cellulose acetate.

It is possible to introduce durable colors into cellulose acetate by dyeing the cellulose before it is acetylated with a dye which is not destroyed by the acetylating reagents. A satisfactory color can thus be obtained, but the products are commercially worthless because they do not possess sufficient flexibility and toughness for either high-grade molding compositions or coating compositions and films. Although this method of dyeing cellulose acetate was proposed as early as 1911, nothing has ever been done with it practically because of the lack of flexibility and workability of the products obtained.

According to the present invention cellulose acetate compositions or compositions of similar organic esters such as cellulose formate, cellulose propionate, cellulose butyrate, cellulose stearate, cellulose palmitate, celluose benzoate or cellulose phthalate are prepared by coloring the cellulose with suitable dyes capable of resisting the esterification process and the colored cellulose ester is then incorporated with compatible flexibilizing agents which render the plastics and coating compositions flexible and tough without in any way affecting the beautiful fast colors of the colored ester. While any compatible flexibilizing agent can be used, provided it is not of a color or turbidity which will deleteriously affect the color of the final composition, I prefer to use modifying agents which permit the formation of coating compositions with relatively cheap solvents which yet have the desirable properties of compositions which contain much more expensive high boiling solvents. These preferred modifiers or compatible material include the class of synthetic resinous materials produced by the reaction of polyhydric alcohols with polybasic acids or certain monobasic acids and particularly with both polybasic and monobasic acids. Examples of these resinous materials are those produced by the reaction of glycerin, glycol, glycol ethers, glycerin ethers, etc. with phthalic anhydride, maleic acid, fumaric acid, succinic acid, malic acid, adipic acid or tartaric acid, modified with a monobasic acid or glyceride monobasic acid, for example benzoic acid, rosin, other natural acid resins such as congo, copal or higher fatty acids such as, for example, stearic acid, palmitic acid, lactic acid, oleic acid, the acids of cocoanut oil, soya-bean oil and other oils, drying, semi-drying or nondrying. Another class is formed by the reaction of polyhydric alcohols with benzoic acid, benzoyl-benzoic acid and its homologues, naphthoylbenzoic acid and other keto aromatic acids with or without phthalic anhydride or similar dibasic acid. Other compatible flexibilizing agents are modified aldehyde amine condensation products such as, for example, products obtained by the condensation of mono- or dimethyl urea with phthalic anhydride and the like. Certain polyhydric alcohol poly- or monobasic acid resins may be prepared including oxymethylbenzoic acid or its lactone phthalide or derivatives thereof and are particularly useful. With the exception of the resins containing phthalide or other derivatives of oxymethylbenzoic acid and certain resins containing higher keto aromatic acids these compatible resins are not new products and are therefore claimed only in connection with the colored cellulose ester compositions of the present invention.

When a suitable compatible flexibilizing agent is used a coating composition can be prepared with relatively cheap low boiling solvents which dries readily but which does not crack, peel or blush. A great saving, of course, is effected by eliminating the expensive high-boiling solvents which are necessary if a flexibilizing agent is not used, and the products are far superior in toughness and flexibility to those obtained from colored cellulose acetate alone.

Another important group of flexibilizing agents are the non-alkali forming metal salts and esters of the keto aromatic acids. These agents are not claimed per se in the present application except in combination with the colored cellulose esters, but form respectively the subject matter of the application of L. C. Daniels Serial No. 476,715 filed August 20, 1930 and A. O. Jaeger Serial No. 395,966 filed September 28, 1929.

Where it is desired to produce colored brush lacquers or where cheap toxic diluents or extenders such as benzol are used, it is sometimes desirable to incorporate an agent which prevents rapid setting or rapid evaporation of the poisonous extender at low temperatures. Certain waxes, particularly hydrocarbon waxes and ceresine, ozokerite and the like may be used in small quantities.

Other plasticizers such as esters of phthalic anhydride, toluene sulphonamides; esters of aliphatic dibasic acids may also be used and are included.

Some of the preferred polyhydric alcohol poly- or monobasic acid resins used in flexibilizing the colored cellulose esters may show a rather high acid number which is frequently undesirable when the product is to be used on or in connection with metals which are easily attacked by acids. In such cases basic material may be added to neutralize the excess acid. Among such bases, ammonia, amines such as aniline, imides such as urea, certain imide derivatives such as basic derivatives of phthalimide, etc. may be used. Care should be taken in the case of high acid number in using neutralizing agents such as ammonia as the product may be rendered water soluble or at least may not resist water to a satisfactory degree.

While beautiful colors may be obtained by introducing the colored cellulose ester alone, it is sometimes desirable to use a relatively major portion of flexibilizing agent, and in such cases additional color may have to be introduced. This, of course, can be done by incorporating pigments, but the color is then opaque and the advantages of the beautifully transparent, completely uniform color which is obtained by the colored cellulose ester itself are sacrificed; while in its broader aspects such compositions are included, it is preferred where more highly colored material is desired to incorporate the color in the form of a solution. This presents some difficulty because the highly resistant colors, especially vat dyes which are preferred in dyeing the cellulose ester, are not soluble in the ordinary solvents. However, they are soluble in phthalide which is itself a good flexibilizing agent and they may accordingly be incorporated in solution in phthalide.

The preferred compositions of the present invention may be used with solvents which need not be completely dehydrated as there is no tendency for the coating compositions to blush even though no high boiling water eliminators are used, nor is the clear color of the cellulose ester in any way affected. As many of the ordinary solvents used are somewhat difficult to dehydrate and this always adds to the cost of the product, the resistance to small moisture content of the solvents is an added advantage of the composition of the present invention, but of course in its broader aspects the invention includes compositions in which all of the compositions are absolutely anhydrous. In coating compositions made according to the present invention the solvents may be the ordinary cheap low boiling solvents and extenders used in dissolving the ordinary cellulose acetate compositions, it being an advantage of the present invention that no new solvents are required. The present invention is, therefore, not particularly concerned with any special solvents or solvent mixtures except that it permits the use of solvent mixtures which do not contain high-boiling solvent eliminants or blush preventative solvents.

The invention will be described in greater detail in connection with the following specific examples which illustrate typical modifications and applications of the invention.

*Example 1*

Cotton linters are dyed with 2% of dimethyl dinaphthylimide, a beautiful deep rose color being obtained on oxidizing the vat color in air. 200 parts of the dyed linters are then esterified with 1600 parts of a mixture of acetic anhydride and acetic acid to which 20 parts of sulfuric acid has been added as a catalyst. A brilliant red solution is obtained which is precipitated with water, the cellulose ester is washed, dried and dissolved in chloroform or acetone. This is mixed with 300 parts of a resin prepared by reacting glycerin, phthalic anhydride and the fatty acids of cocoanut oil in the proportion of 1 mol of glycerin to 1 mol phthalic anhydride and 1 mol of cocoanut oil fatty acid. The solution is thoroughly mixed and if desired suitable extenders such as benzol or toluol may be added. The composition forms an excellent lacquer, drying to a beautiful transparent or translucent deep rose colored film which shows great toughness and flexibility and absolutely uniform color.

Instead of using dimethyl dinaphthylimide, other perylene vat dyes may be used such as Caledon jade green, violanthrone, isoviolanthrone, indanthrene green B, etc., beautiful colored lacquers being obtained.

Instead of using the fatty acids of cocoanut oil, cocoanut oil itself may be used in preparing the flexibilizing resin.

*Example 2*

Cellulose is dyed with indanthrene blue G. C. D. in a 1–2% dyeing and is acetylated or formylated as described in Example 1. The blue acetyl or formyl cellulose is then incorporated with an equal part of a resin obtained by the reaction of equimolecular quantities of glycerin, phthalic anhydride and rosin, to which is added 50% of a resin obtained by the reaction of glycerin, phthalic anhydride and phthalide in equimolecular proportions, the whole being dissolved in the ordinary low boiling lacquer solvents. A brilliant blue lacquer is obtained which brushes well and which forms a transparent, brilliant blue film.

Instead of using a resin obtained from glycerin, phthalic anhydride and phthalide, a resin obtained from glycol or monoethyl ether of glycol and phthalic anhydride may be used.

*Example 3*

Cellulose is dyed with a sulfur dye such as Katigen violet, about a 4% dyeing being used. The dyed cellulose is then acetylated or butyrated as described in Example 1 and is incorporated with equal amounts of a resin obtained by the reaction of glycerin, phthalic anhydride and naphthoylbenzoic acid in equimolecular proportions and zinc benzoylbenzoate. Sufficient solvent is added so that the materials can be readily mixed on rolls and molded or formed into sheets, the resulting product showing a clear, brilliant violet and being transparent or translucent.

If desired, 2-5% of a plasticizer such as dibutyl phthalate, butyl benzoylbenzoate or phthalimidine may be added.

Example 4

Cotton is dyed with an algol color, such as algol red or red-orange and is acetylated as in Example 1. 100 parts of the dyed acetyl cellulose is mixed with 100 parts of a resin prepared by reacting glycerin or glycol with 3 or 2 mols. of naphthoylbenzoic acid respectively, together with 10-20 parts of a resin obtained by the reaction of dimethanol urea with phthalic anhydride and 30 parts of a resin obtained by the reaction of equal parts of toluidine and tung oil which has been heated to about 285° C. in the presence of zinc chloride. The mixture does not give a transparent film but it does give a beautiful translucent film of brilliant color, the reddish tinge of the toluidine-tung oil somewhat deepening the shade of the acetyl cellulose.

Example 5

Acetyl cellulose is prepared as in Example 1, using dimethyl dinaphthylimide or Caledon jade green as a dye. A plastic composition is then formed with an equal amount of rosin-phthalic-glyceride resin. An amount of phthalide equal to 20% of the acetyl cellulose is heated until it melts and the same vat dye used in dyeing the acetyl cellulose is dissolved in the phthalide until a substantially saturated solution is obtained. This solution of the dye is then incorporated with the other ingredients, if necessary with a small amount of solvent, and the whole is worked on rolls until a uniform, deeply colored plastic is formed which then may be molded into sheets, rods, etc. in the usual manner.

The examples set forth typical compositions falling under the present invention, and it should be understood that they may be used for the purposes for which similar compositions are ordinarily employed. Thus, for example, all types of plastics may be prepared from them, coating compositions of various types such as brushing lacquers, spraying lacquers, priming coats and the like may be formed, and very desirable coating compositions can be prepared for floor coverings such as linoleums, coated asphalt, saturated felts and the like. The brilliant transparent colors of the coating compositions, however, require in the case of some floor coverings the addition of opacifying pigments such as zinc oxide, lithopone, etc., and of course where the invention is used in coating compositions in which transparency is not desirable such suitable opacifiers will be added.

What is claimed as new is:

A composition comprising a colored cellulose ester obtained by dyeing cellulose with a vat dye and esterifying the dyed cellulose with an organic acid, a modified polyhydric alcohol-polybasic acid resin compatible therewith and phthalide, the phthalide containing dissolved therein an addition of the same vat dye used in dyeing the cellulose.

ALPHONS O. JAEGER.